US005976237A

United States Patent [19]
Halko et al.

[11] Patent Number: 5,976,237
[45] Date of Patent: *Nov. 2, 1999

[54] PIGMENT PROCESS FOR DURABLE PIGMENTS

[75] Inventors: John E. Halko, Okarche; Fran Tyler, Edmond, both of Okla.

[73] Assignee: Kerr-McGee Chemical Corporation, Oklahoma City, Okla.

[*] Notice: This patent issued on a continued prosecution application filed under 37 CFR 1.53(d), and is subject to the twenty year patent term provisions of 35 U.S.C. 154(a)(2).

[21] Appl. No.: 08/807,732

[22] Filed: Feb. 27, 1997

[51] Int. Cl.⁶ ............................................. C09B 1/36
[52] U.S. Cl. ..................... 106/443; 106/436; 106/437; 106/438; 106/441; 106/446; 106/450; 106/454
[58] Field of Search ........................... 106/436, 437, 106/438, 441, 442, 443, 446, 450, 454

[56] References Cited

U.S. PATENT DOCUMENTS

| | | | |
|---|---|---|---|
| 3,515,566 | 6/1970 | Moody et al. | 106/438 |
| 5,332,433 | 7/1994 | Story et al. | 106/442 |
| 5,607,504 | 3/1997 | Schmid et al. | 106/403 |
| 5,650,002 | 7/1997 | Bolt | 106/438 |
| 5,700,318 | 12/1997 | Brand et al. | 106/442 |

*Primary Examiner*—Mark L. Bell
*Assistant Examiner*—Scott L. Hertzog
*Attorney, Agent, or Firm*—C. Clark Dougherty, Jr

[57] ABSTRACT

Improved coated inorganic pigments having a first coating of $Al_2O_3$, $SiO_2$, or optionally other oxide such as a source of $P_2O_5$, or mixtures thereof, an optional coating of $ZrO_2$, $SnO_2$, $TiO_2$, $SiO_2$, $CeO_2$ or mixtures thereof, and a final coating of $Al_2O_3$ which exhibit good durability, dispersibility, and optical properties in plastic or paint compositions are disclosed. Also disclosed is a process whereby an aqueous slurry of an inorganic pigment is milled to achieve a particular particle size distribution, a first coating of $Al_2O_3$, $SiO_2$, or optionally other oxide such as a source of $P_2O_5$, or mixtures thereof is precipitated onto the pigment material within a first pH range, an optional amount of $ZrO_2$, $SnO_2$, $SiO_2$, $TiO_2$, $CeO_2$ or mixtures thereof is added to the aqueous slurry within a second pH range to obtain an optional coating over the first coating, and a final coating of $Al_2O_3$ is added over the prior coating(s).

45 Claims, No Drawings

PIGMENT PROCESS FOR DURABLE PIGMENTS

BACKGROUND OF THE INVENTION

1. Field of the Invention

The present invention relates to improved inorganic pigments coated with $ZrO_2$, $SiO_2$, $Al_2O_3$, $TiO_2$, $SnO_2$ or $CeO_2$ or mixtures thereof and a method for multi-coating inorganic pigments to achieve good durability, low photochemical and chemical reactivity, and good optical and dispersibility properties in plastic and paint applications. Most specifically, the present invention relates to an improved titanium dioxide pigment having a first coating of $Al_2O_3$, $SiO_2$ or optionally other inorganic coating material or mixtures thereof, and an optional coating of $ZrO_2$, $SiO_2$, $TiO_2$, $SnO_2$, $CeO_2$ or mixtures thereof over the first coating and a final coating of $Al_2O_3$.

2. Description of the Prior Art

The surface treatment and coating of inorganic pigments, such as titanium dioxide for example, to achieve improved performance characteristics in plastic compositions, is known in the art. Dispersibility, processability and good optical properties are typically achieved through minimal surface treatment of the pigment, whereas durability and low chemical and photochemical reactivity is typically obtained by coating the pigment with silica, alumina, and other metal oxide coatings. When precipitated using prior art practices, these metal oxide coatings tend to make the pigments more difficult to disperse in plastics or paints. Typically, these problems have not been solved with a single pigment. Thus, plastics compounders have generally had to choose between durability, which can be achieved with coated pigments, and dispersibility, processability and good optical properties, which can be achieved with treated and untreated pigments. Similarly, paint performance can be improved through conventional surface treatments, but adding the first treating agent prior to crossing the isoelectric point maximizes both durability and dispersibility.

For example, U.S. Pat. No. 3,523,810 discloses a process for coating titania pigments with from 0.5 percent to 10 percent boehmite alumina at a pH of from 7 to 9 at temperatures between 70 and 100° C. A pigment of this type with only boehmite and no amorphous alumina may have good optical and dispersibility properties but does not achieve good durability. Similarly, U.S. Pat. No. 4,022,636 describes the addition of two coatings of alumina to titanium dioxide pigments, one amorphous coating at a pH of about 2 followed by a boehmite coating at a pH of about 8, to achieve a pigment with good performance in plastics. Also, U.S. Pat. No. 4,416,699 describes a method for coating a pigment with between 2 percent and 6 percent alumina to achieve the chalk-fade resistance, gloss, and dispersibility required for paint grades of titanium dioxide. However, this process contains higher alumina levels than are permissible for optimum performance of titanium dioxide pigments in plastic applications.

Examples of inorganic pigment coating processes to which improved performance benefits have been ascribed include the coating process disclosed in U.S. Pat. No. 2,671,031. This patent teaches the precipitation of a hydrous aluminum oxide coating upon titanium dioxide followed by heat treatment between 500° C. and 800° C. to decrease pigment chalking. U.S. Pat. No. 2,780,558 discloses a process for coating pigmentary materials with alumina added as an alcoholate compound. In U.S. Pat. No. 3,146,119 the claimed process requires the precipitation of a layer of titanium dioxide onto the pigment prior to the precipitation of an alumina layer. U.S. Pat. No. 3,409,454 discloses an alumina-coated titanium dioxide pigment and process for obtaining the same wherein the alumina is precipitated onto the pigment under alkaline conditions (pH greater than 10) for improved pigment dispersibility in plastics. U.S. Pat. No. 3,529,985 discloses a double coated titanium dioxide pigment wherein the first metal oxide coating is calcined at a temperature of at least 450° C. before addition of the second coating for improved durability and optical properties. U.S. Pat. No. 3,853,575 discloses the production of alumina-coated titanium dioxide pigments wherein the alumina coating is supplied by the addition of an alkaline alumina salt to an aqueous titanium dioxide solution. U.S. Pat. No. 4,239,548 discloses a titanium dioxide pigment with improved photochemical stability achieved by a first coating of cerium and phosphate radicals onto the pigment and a second coating of aluminum and phosphate radicals over the first coating. U.S. Pat. No. 5,114,486 discloses a process for coating titanium dioxide pigments with zinc, phosphate, and aluminum ions for improved processibility.

None of the aforementioned patents suggest or teach the coating of inorganic pigments with a first layer of $Al_2O_3$ $SiO_2$ or optionally other inorganic material or mixtures thereof, and an optional layer of $ZrO_2$, $SiO_2$, $TiO_2$, $SnO_2$, $CeO_2$ or mixtures thereof and a final coating of $Al_2O_3$, to produce the coated pigments which are the subject of this application.

SUMMARY OF THE INVENTION

An object of the present invention is to provide durable coated inorganic pigments with good optical properties, dispersibility, and chemical stability in both paint and plastics applications. A further object is to provide improved inorganic pigments, preferably titanium dioxide pigments, having deposited thereon a first coating of $SiO_2$, $Al_2O_3$ or optionally other oxides or mixtures thereof before passing through the isoelectric point and an optional coating of $ZrO_2$, $SiO_2$, $SnO_2$, $CeO_2$ or mixtures thereof and a final coating of $Al_2O_3$. An additional object of the present invention is to provide a process by which such coated inorganic pigments are produced.

DESCRIPTION OF THE PREFERRED EMBODIMENTS

The present invention relates to an inorganic pigment having a coating of $Al_2O_3$ or $ZrO_2$ or $SiO_2$ or $CeO_2$ or $SnO_2$ or $TiO_2$ or mixtures thereof comprising an inorganic pigment material wherein the coating is at least about 0.25 percent by weight based upon the weight of said pigment material, having a first coating of $Al_2O_3$, $SiO_2$ or optionally other oxide or mixture thereof deposited on said inorganic pigment prior to said pigment flocculating or passing through its isoelectric point, and an optional coating of $ZrO_2$, $CeO_2$, $TiO_2$, $SiO_2$, $SnO_2$ or mixtures thereof deposited over said first coating after said pigment has passed through its isoelectric point; said first coating being achieved in a discrete interval and said optional coating being achieved in a discrete interval or continuously. Preferably the optional other oxide is a source of $P_2O_5$.

Advantageously the inorganic pigment has a coating of from about 0.25 percent to about 5 percent by weight based upon the weight of said pigment. Preferably the inorganic pigment has a coating of from about 0.5 percent to about 3 percent by weight based upon the weight of said pigment material and most preferably the inorganic pigment has a coating of about 1.3 percent by weight based upon the weight of said pigment material.

Advantageously the inorganic pigment employed is titanium dioxide.

The process for preparing the inorganic pigment of the present invention coated with at least 0.25 percent by weight based on the weight of the pigment of $ZrO_2$, $CeO_2$, $Al_2O_3$, $TiO_2$, $SiO_2$, $SnO_2$ or mixtures thereof comprises the steps of:

(a) milling an aqueous slurry containing the inorganic pigment material, in the presence of a dispersing agent, to achieve a particle size distribution of said material wherein no more than about 5 percent of said pigment particles are greater than 0.49 microns as measured by a Microtrac 9200 FRA;

(b) removing the milling media from said aqueous slurry;

(c) depositing a first coating of $Al_2O_3$, $SiO_2$ or optionally other oxides or mixtures thereof on the inorganic pigment material prior to said pigment flocculating or passing through its isoelectric point;

(d) adding an optional coating of $ZrO_2$, $CeO_2$, $SiO_2$, $SnO_2$, $TiO_2$ or mixtures thereof to said slurry after the inorganic pigment material has passed through its isoelectric point and adjusting the slurry pH to form a second coating on said pigment;

(e) digesting the slurry at a temperature of from about 50° C. to about 80° C. for a time of from about 5 to about 60 minutes;

(f) adding a final coating of $Al_2O_3$;

(g) adjusting the pH of the slurry to a level within the range of from about 6 to about 9 and digesting said slurry at a temperature of from about 50° C. to about 70° C. for a time of from about 5 to about 60 minutes to complete formation of said second coating deposited in step (f) over said prior coating; and (h) recovering said coated pigment.

Preferably the optional other oxide of step (c) above is a source of $P_2O_5$.

Advantageously the pigment material is coated with a total amount of coating(s) of from about 1 percent to about 3 percent $ZrO_2$, $TiO_2$, $SnO_2$, $SiO_2$, $Al_2O_3$, $CeO_2$ or mixtures thereof by weight based upon the weight of said pigment material. Preferably the pigment material is coated with from about 1.3 percent to about 2.0 percent $ZrO_2$, $TiO_2$, $SnO_2$, $SiO_2$, $Al_2O_3$, $CeO_2$ or mixtures thereof by weight based upon the weight of said pigment material.

Advantageously for pigments to be used in plastics, the first coating is from about 0.1% to about 0.3% by weight. For pigments to be used in paint applications, the first coating advantageously is from about 0.3% to about 1.0% by weight.

Advantageously, the final layer of $Al_2O_3$ on pigments used in plastics application will be rom about 0.1% to about 0.3% by weight. For pigments used in paint applications the final coating advantageously is from about 1% to about 3% by weight.

The process of the present invention optionally may contain a second amount of a dispersing agent added in step (d).

Advantageously the dispersing agent in steps (a) and (d) is selected from the group consisting of phosphates, polyols and amines. Preferably the dispersing agent is sodium hexametaphosphate. Advantageously the dispersing agent in step (a) is present in an amount in the range of from about 0.05 percent to about 0.50 percent by weight based upon the weight of said pigment material. Preferably the dispersing agent in step (a) is present in an amount of about 0.15 percent by weight based upon the weight of said pigment material. Advantageously the dispersing agent in step (d) is present in an amount in the range of from about 0.05 percent to about 0.50 percent by weight based upon the weight of said pigment material. Preferably the dispersing agent in step (d) is present in an amount of about 0.30 percent by weight based upon the weight of said pigment material.

In the present invention from about 0.1 percent to about 10 percent of said pigment particles are 0.49 microns or greater as measured by a Microtrac 9200 FRA. Advantageously from about 0.1 percent to about 5 percent of said pigment particles are 0.49 microns or greater and preferably less than about 2 percent of said pigment particles are 0.49 microns or greater.

Advantageously the milling media of step (a) is sand. Preferably the temperature during steps (d) through (g) is maintained within a range of from about 50° C. to about 80° C. and most preferably the temperature is maintained at about 60° C.

Advantageously the coating provided is an acidic or alkaline salt of $ZrO_2$, $TiO_2$, $SiO_2$, $SnO_2$, $CeO_2$ or mixtures thereof Preferably said $ZrO_2$ coating agent is zirconium orthosulfate.

In the process of the present invention the amount of $Al_2O_3$, $SiO_2$, or optionally other oxides or mixtures thereof coating added in step (c) is sufficient to provide said first coating in an amount within the range of from about 0.1 percent to about 1 percent by weight based upon the weight of said pigment material. Advantageously the $Al_2O_3$, $SiO_2$ or mixtures thereof added in step (c) is sufficient to provide said first coating in an amount within the range of from about 0.3 percent to about 0.7 percent by weight based upon the weight of said pigment material for paint applications and from about 0.1 to about 0.3 percent for plastic applications. Preferably the $Al_2O_3$, $SiO_2$ or mixtures thereof added in step (c) is sufficient to provide said first coating in an amount of about 0.5 percent by weight based upon the weight of said pigment material.

In the process of the present invention the $ZrO_2$, $SiO_2$, $SnO_2$, $TiO_2$, $CeO_2$ or mixtures thereof optionally added in step (d) is sufficient to provide said optional coating in an amount within a range of from about 0.2 percent to about 1.2 percent by weight based upon the weight of said pigment material. Advantageously the $ZrO_2$, $SiO_2$, $SnO_2$, $TiO_2$, $CeO_2$ or mixtures thereof added in step (d) is sufficient to provide said optional coating in an amount within a range of from about 0.5 percent to about 1.0 percent by weight based upon the weight of said pigment material. Preferably the $ZrO_2$, $SiO_2$, $SnO_2$, $TiO_2$, $CeO_2$ or mixtures thereof added in step (d) is sufficient to provide said an optional coating in an amount of about 0.60 percent by weight based upon the weight of said pigment material.

Advantageously the pH of said slurry during step (a) is about 10. The pH of said slurry in step (d) is advantageously adjusted to a level within the range of from about 3 to about 7 and preferably the pH of said slurry is adjusted to about 5. Advantageously the pH of said slurry in step (f) is adjusted to about 5. The pH of said slurry in step (g) advantageously is adjusted to a level within a range of from about 7 to about 9 and preferably the pH of said slurry is adjusted to about 7.8. Advantageously the pH adjusting agent in step (d) is a mineral acid, preferably sulfuric acid. Preferably said pH adjusting agent in steps (f) and (g) is an alkali metal hydroxide base. Preferably such pH adjusting agent is sodium hydroxide.

Advantageously said slurry is digested in step (e) for from about 10 to about 45 minutes and preferably said slurry is digested for about 15 minutes. Advantageously said slurry is digested in step (g) for from about 10 to about 45 minutes and preferably said slurry is digested for about 30 minutes. Advantageously the coated pigment is recovered by filtering, drying and milling.

EXAMPLE 1

An aqueous slurry comprising 1800 g of $TiO_2$ was dispersed with 0.15% sodium hexametaphosphate and sand-milled to obtain a particle size distribution of 7% of particles having a size greater than 0.49 micron. The sand was removed after milling. The slurry was then diluted to a volume of 4.5 L, 2.54 g calgon (a source of $P_2O_5$) was added and the temperature adjusted to 60° C. 0.4899 g/mL, $Al_2O_3$ was added as sodium aluminate. The pH was adjusted to 3.5 with 5.0 mL sulfuric acid and the solution digested for 15 minutes. The pH of the solution was then adjusted to 5.75 with 5.0 mL sodium hydroxide. 0.9802 g/mL alumina was then added as sodium aluminate, the pH was maintained at less than 6.0 and the solution digested for 30 minutes. The pH was then adjusted to 7.8 with 4.3 mL sodium hydroxide and digested an additional 15 minutes. The samples were then filtered, dried and micronized with 0.35% TMP. The results are reported in Table 1.

EXAMPLE 2

The treatment of Example 1 was repeated. Pigment was micronized with 0.40% TMP/0.3% TEA.

Reference 1 was a heavily treated "durable" pigment for plastics.

Reference 2 was an untreated pigment for plastics.

Reference 3 was a standard plastics grade pigment.

TABLE 1

|  | Example 1 | Example 2 | Reference 1 | Reference 2 | Reference 3 |
|---|---|---|---|---|---|
| Optical and Dispersibility Properties | | | | | |
| Tint Strength | 99.8 | 100.7 | 97.5 | 100.1 | 101.8 |
| Brightness | 102.4 | 103.0 | 99.3 | 99.8 | 100.7 |
| Screen Pack (Disp) | 38 | na | 58 | 63 | na |
| Reactivity and Durability Tests* | | | | | |
| Photo-induced Anti-oxidant Yellowing | 4.6 | 3.2 | 4.2 | 12 | 8.5 |
| Durability | 10 | 6.1 | 12 | 29 | 24 |
| Volatiles @ 350 C. | 0.63 | 0.71 | 1.2 | .37 | .48 |

*Lower numbers indicate lower reactivity in these tests and are therefore preferred.

EXAMPLE 3

An aqueous slurry containing 872 g $TiO_2$ was dispersed with 0.15% sodium hexametaphosphate and sandmilled to obtain a particle size distribution having 10% of the particles greater than 0.49 micron. The sand was removed after milling. The temperature of the slurry was adjusted to 70° C. 0.8% $Al_2O_3$, 23.2 ml of 301 g/l $Al_2O_3$ solution, was added as sodium aluminate. 6.8 ml sulfuric acid was added to precipitate the alumina and reduce the slurry pH. The slurry was digested for 15 minutes at 70° C. 2.0% $Al_2O_3$ or 57.9 ml of sodium aluminate solution was added to the slurry, and the slurry was digested an additional 30 minutes. 13.5 ml sulfuric acid was added to the slurry to precipitate the alumina and reduce the slurry to a pH=7.3. After an additional 15 minutes digestion the pigment was filtered, washed and dried. The pigment was fluid energy milled with 0.35% organic milling aid. The optical performance of material from this Example was compared to Reference 4 which was a standard paint grade pigment.

TABLE 2

Average Results

| OPTICAL TEST | Control REFERENCE 4 | Improved Process EXAMPLE 3 |
|---|---|---|
| Acrylic Gloss | 61 | 65 |
| Veh. Brightness | 95.46 | 95.66 |
| Veh. Color | 0.57 | 0.48 |
| Tint Tone | −4.34 | −4.41 |
| Tint Strength | 642 | 703 |
| Scatter | 6.10 | 6.24 |
| Semi-gloss latex | 64 | 68 |
| Durability | 21 | 18 |

The data indicate that the maximum benefits of sandmilling are not realized without employing the inventive process which initiates the coating process before flocculation is induced.

What is claimed is:

1. An inorganic pigment having a coating of $ZrO_2$, $SiO_2$, $SnO_2$, $TiO_2$, $Al_2O_3$, $CeO_2$ or mixtures thereof comprising an inorganic pigment material wherein the coating is at least about 0.25 percent by weight based upon the weight of said pigment material, having a first coating of $Al_2O_3$, $SiO_2$ or mixtures thereof deposited on said inorganic pigment prior to said pigment flocculating or passing through its isoelectric point, an optional coating selected from the group consisting of $ZrO_2$, $SnO_2$, $SiO_2$, $TiO_2$, $CeO_2$ and mixtures thereof deposited over said first coating after said pigment has passed through its isoelectric point; said first coating being achieved in a discrete interval and said second coating being achieved in a discrete interval or continuously and a final coating of $Al_2O_3$ deposited over the first coating and the optional coating when an optional coating is present.

2. The coated inorganic pigment of claim 1 wherein said coating is from about 0.25 percent to about 5 percent by weight based upon the weight of said pigment.

3. The coated inorganic pigment of claim 2 wherein said coating is from about 1 percent to about 3 percent by weight based upon the weight of said pigment material.

4. The coated inorganic pigment of claim 3 wherein said coating is from about 1.3 percent to about 2 percent by weight based upon the weight of said pigment material.

5. The inorganic pigment of claim 1 wherein the first coating includes a source of $P_2O_5$.

6. The coated inorganic pigment of claim 1 wherein said pigment material is titanium dioxide.

7. A process for preparing an inorganic pigment coated with at least about 0.25 percent by weight based on the weight of the pigment of $ZrO_2$, $SnO_2$, $SiO_2$, $TiO_2$, $Al_2O_3$, $CeO_2$ or mixtures thereof comprising the steps of:

(a) milling an aqueous slurry containing the inorganic pigment material, in the presence of a dispersing agent, to achieve a particle size distribution of said material wherein no more than about 10 percent of said pigment particles are greater than 0.49 microns;

(b) removing the milling media from said aqueous slurry;

(c) depositing a first coating of $Al_2O_3$, $SiO_2$ or mixtures thereof on the inorganic pigment material prior to said pigment flocculating or passing through its isoelectric point;

(d) digesting the slurry at a temperature of from about 50° C. to about 80° C. for a time of from about 5 to about 60 minutes;

(e) coating the pigment with a final coating of $Al_2O_3$;

(f) adjusting the pH of the slurry to a level within the range of from about 6 to about 9 and digesting said slurry at a temperature of from about 50° C. to about 80° C. for a time of from about 5 to about 60 minutes to complete formation of said second coating over said first coating;

(g) recovering said coated pigment.

8. The process of claim 7 including the step of adding a coating of $ZrO_2$, $SnO_2$, $SiO_2$, $TiO_2$, $CeO_2$ or mixtures thereof to said slurry after the inorganic pigment material has passed through its isoelectric point and adjusting the slurry pH to a level of at least about 3 to form a second coating on said pigment.

9. The process of claim 8 wherein in said additional coating step the pigment material is coated with from about 1 percent to about 5 percent $ZrO_2$, $SiO_2$, $SnO_2$, $TiO_2$, $CeO_2$ or mixtures thereof by weight based upon the weight of said pigment material.

10. The process of claim 9 wherein in said additional coating step the pigment material is coated with from about 1.3 percent to about 2.0 percent $ZrO_2$ or $CeO_2$ or mixtures thereof by weight based upon the weight of said pigment material.

11. The process of claim 7 wherein step (c) includes depositing a coating containing a source of $P_2O_5$.

12. The process of claim 7 wherein said pigment material is titanium dioxide.

13. The process of claim 7 wherein a second amount of a dispersing agent is added in step (d).

14. The process of claim 13 wherein said dispersing agent in steps (a) and (d) is selected from the group consisting of phosphates, polyols and amines.

15. The process of claim 14 wherein said dispersing agent is sodium hexametaphosphate.

16. The process of claim 7 wherein said dispersing agent in step (a) is present in an amount in the range of from about 0.05 percent to about 0.50 percent by weight based upon the weight of said pigment material.

17. The process of claim 13 wherein said dispersing agent in step (d) is present in an amount in the range of from about 0.05 percent to about 0.50 percent by weight based upon the weight of said pigment material.

18. The process of claim 7 wherein from about 0.1 percent to about 5 percent of said pigment particles are 0.49 microns or greater.

19. The process of claim 18 wherein less than about 2 percent of said pigment particles are 0.49 microns or greater.

20. The process of claim 7 wherein the milling media of step (a) is sand.

21. The process of claim 8 wherein the temperature after steps (c) through (f) is maintained within the range of from about 50° C. to about 80° C.

22. The process of claim 21 wherein the temperature is maintained at about 60° C.

23. The process of claim 8 wherein the $ZrO_2$, $SnO_2$, $TiO_2$, $SiO_2$, $CeO_2$ or mixtures thereof coating is provided by an acidic or alkaline inorganic salt of Zr, Sn, Ti, Si, or Ce.

24. The process of claim 23 wherein said $ZrO_2$ coating is provided by zirconium orthosulfate.

25. The process of claim 11 wherein the amount of $Al_2O_3$, $SiO_2$, source of $P_2O_5$ or mixtures thereof coating added in step (c) is sufficient to provide said first coating in an amount within the range of from about 0.1 percent to about 1 percent by weight based upon the weight of said pigment material.

26. The process of claim 25 wherein the $Al_2O_3$, $SiO_2$, source of $P_2O_5$ or mixtures thereof added in step (c) is sufficient to provide said first coating in an amount within the range of from about 0.2 percent to about 0.5 percent by weight based upon the weight of said pigment material.

27. The process of claim 26 wherein the $Al_2O_3$, $SiO_2$, source of $P_2O_5$ or mixtures thereof added is sufficient to provide said first coating in an amount of about 0.35 percent by weight based upon the weight of said pigment material.

28. The process of claim 8 wherein the additional coating of $ZrO_2$, $SnO_2$, $SiO_2$, $TiO_2$, $CeO_2$ or mixtures thereof added is sufficient to provide said coating in an amount within a range of from about 0.2 percent to about 1.2 percent by weight based upon the weight of said pigment material.

29. The process of claim 28 wherein the $ZrO_2$, $SnO_2$, $SiO_2$, $TiO_2$, $CeO_2$ or mixtures thereof added is sufficient to provide said additional coating in an amount within a range of from about 0.5 percent to about 1.0 percent by weight based upon the weight of said pigment material.

30. The process of claim 29 wherein the additional coating of $ZrO_2$, $CeO_2$, $SnO_2$, $SiO_2$, $TiO_2$ or mixtures thereof added is sufficient to provide said coating in an amount of about 0.60 percent by weight based upon the weight of said pigment material.

31. The process of claim 8 wherein the pH of said slurry in the optional step is adjusted to a level within the range of from about 3 to about 7.

32. The process of claim 21 wherein the pH of said slurry is adjusted to a level of about 5.

33. The process of claim 7 wherein the pH of said slurry in step (e) is adjusted to about 5.

34. The process of claim 7 wherein the pH of said slurry in step (f) is adjusted to a level within the range of from about 7 to about 9.

35. The process of claim 34 wherein the pH of said slurry is adjusted to about 8.

36. The process of claim 8 wherein the pH adjusting agent is a mineral acid.

37. The process of claim 36 wherein said pH adjusting agent is sulfuric acid.

38. The process of claim 7 wherein the pH adjusting agent in steps (e) and (f) is an alkali metal hydroxide base.

39. The process of claim 38 wherein said pH adjusting agent is sodium hydroxide.

40. The process of claim 7 wherein said slurry is digested in step (d) for from about 10 to about 45 minutes.

41. The process of claim 40 wherein said slurry is digested for about 30 minutes.

42. The process of claim 7 wherein said slurry is digested in step (f) for from about 10 to about 45 minutes.

43. The process of claim 42 wherein said slurry is digested for about 15 minutes.

44. The process of claim 7 wherein said coated pigment is recovered by filtering, drying and milling.

45. An inorganic pigment having a coating of $ZrO_2$, $SiO_2$, $SnO_2$, $TiO_2$, $Al_2O_3$, $CeO_2$ or mixtures thereof comprising an inorganic pigment material wherein the coating is at least about 0.25 percent by weight based upon the weight of said pigment material, having a first coating of $Al_2O_3$, $SiO_2$ or mixtures thereof deposited on said inorganic pigment prior to said pigment flocculating or passing through its isoelectric point, a second coating selected from the group consisting of $ZrO_2$, $SnO_2$, $SiO_2$, $TiO_2$, $CeO_2$ and mixtures thereof deposited over said first coating after said pigment has passed through its isoelectric point; said first coating being achieved in a discrete interval and said second coating being achieved in a discrete interval or continuously and a final coating of $Al_2O_3$ deposited over the first coating and the second coating.

* * * * *